United States Patent
Gulsen et al.

(10) Patent No.: US 10,803,092 B1
(45) Date of Patent: Oct. 13, 2020

(54) METADATA DRIVEN CATALOG DEFINITION

(71) Applicant: Workday, Inc., Pleasanton, CA (US)

(72) Inventors: Denis Gulsen, Redwood City, CA (US); Erol Guney, San Ramon, CA (US); Eric James Ranstrom, San Francisco, CA (US); Amir Ali Afghani, San Ramon, CA (US); Chandni K. Dhanjal, Fairfield, CA (US)

(73) Assignee: Workday, Inc., Pleasanton, CA (US)

( * ) Notice: Subject to any disclaimer, the term of this patent is extended or adjusted under 35 U.S.C. 154(b) by 325 days.

(21) Appl. No.: 15/693,931

(22) Filed: Sep. 1, 2017

(51) Int. Cl.
    *G06F 16/00* (2019.01)
    *G06F 16/28* (2019.01)
    *G06F 16/9535* (2019.01)

(52) U.S. Cl.
    CPC ........ *G06F 16/285* (2019.01); *G06F 16/9535* (2019.01)

(58) Field of Classification Search
    CPC ............................ G06F 16/285; G06F 16/9535
    See application file for complete search history.

(56) References Cited

U.S. PATENT DOCUMENTS

| | | | |
|---|---|---|---|
| 10,216,449 B1 * | 2/2019 | Li | G06F 11/1451 |
| 2007/0234291 A1 | 10/2007 | Ronen | |
| 2008/0201299 A1 * | 8/2008 | Lehikoinen | G06F 16/48 |
| 2009/0282045 A1 | 11/2009 | Hsieh | |
| 2010/0217758 A1 * | 8/2010 | Weissman | G06F 21/6218 |
| | | | 707/713 |
| 2013/0018890 A1 | 1/2013 | Rajan | |
| 2013/0232156 A1 * | 9/2013 | Dunn | G06F 16/27 |
| | | | 707/752 |
| 2013/0347078 A1 * | 12/2013 | Agarwal | H04L 63/00 |
| | | | 726/4 |
| 2014/0095966 A1 * | 4/2014 | Burkard | G06F 16/9574 |
| | | | 715/205 |
| 2015/0120763 A1 * | 4/2015 | Grue | G06F 16/24 |
| | | | 707/754 |
| 2015/0134694 A1 | 5/2015 | Burke | |
| 2018/0262864 A1 * | 9/2018 | Reynolds | H04L 67/303 |
| 2018/0357226 A1 * | 12/2018 | Su | G06F 16/9535 |

* cited by examiner

*Primary Examiner* — Tarek Chbouki
(74) *Attorney, Agent, or Firm* — Van Pelt, Yi & James LLP

(57) ABSTRACT

A system for a metadata driven catalog definition includes an interface and a processor. The interface is configured to receive an indication to generate a catalog. The processor is configured to traverse a set of data to generate a set of metadata tags, determine a set of sub-categories, wherein a sub-category of the set of subcategories comprises a group of metadata tags associated with the sub-category, and determine a set of categories. A category of the set of categories comprises a group of sub-categories associated with the category. The processor is also configured to provide the catalog comprising a set of filters for filtering data according to the set of categories and the set of sub-categories.

23 Claims, 10 Drawing Sheets

Catalog 400

| Data Categories | Opt-In? |
|---|---|
| Compensation And Benefits | |
| Core Human Resource | |
| Database Software Usage | |
| Leadership And Development | |
| Mobility And Career Development | |
| Recruiting And Hiring | ✓ |
| Turnover And Career Retention | ✓ |
| Workforce Composition | |

402

| Workforce Composition Sub-Categories | Opt-In? |
|---|---|
| Age | |
| Diversity | |
| Education | ✓ |
| Headcount | |
| Structure | ✓ |
| Tenure | |
| Tenure (Summary Level) | |
| Work Hours And Attendance | ✓ |

Fig. 4

METADATA DRIVEN CATALOG DEFINITION

BACKGROUND OF THE INVENTION

A system for a multitenanted database stores data for a plurality of tenants (e.g., organizations utilizing database services). Each tenant comprises a plurality of users (e.g., company employees). The multitenanted database stores user data for each user of each tenant (e.g., name, identification number, title, salary, etc.). Tenant data is stored on a set of data partitions securely separated by tenant (e.g., on different computers, on different hard drives, on different virtual machines, etc.) in order to prevent users from accessing data belonging to other tenants. The system for a multitenanted database, comprising the large set of tenant data, has the capability to produce data analyses that would be valuable to each tenant (e.g., typical group size within organizations of different sizes, average salaries for different employee roles, etc.). However, performing these data analyses creates a problem in that a tenant loses control of their data as it is mixed together for the analysis.

BRIEF DESCRIPTION OF THE DRAWINGS

Various embodiments of the invention are disclosed in the following detailed description and the accompanying drawings.

FIG. 4 is a diagram illustrating an embodiment of a catalog as presented to a tenant.

DETAILED DESCRIPTION

Figure 1:
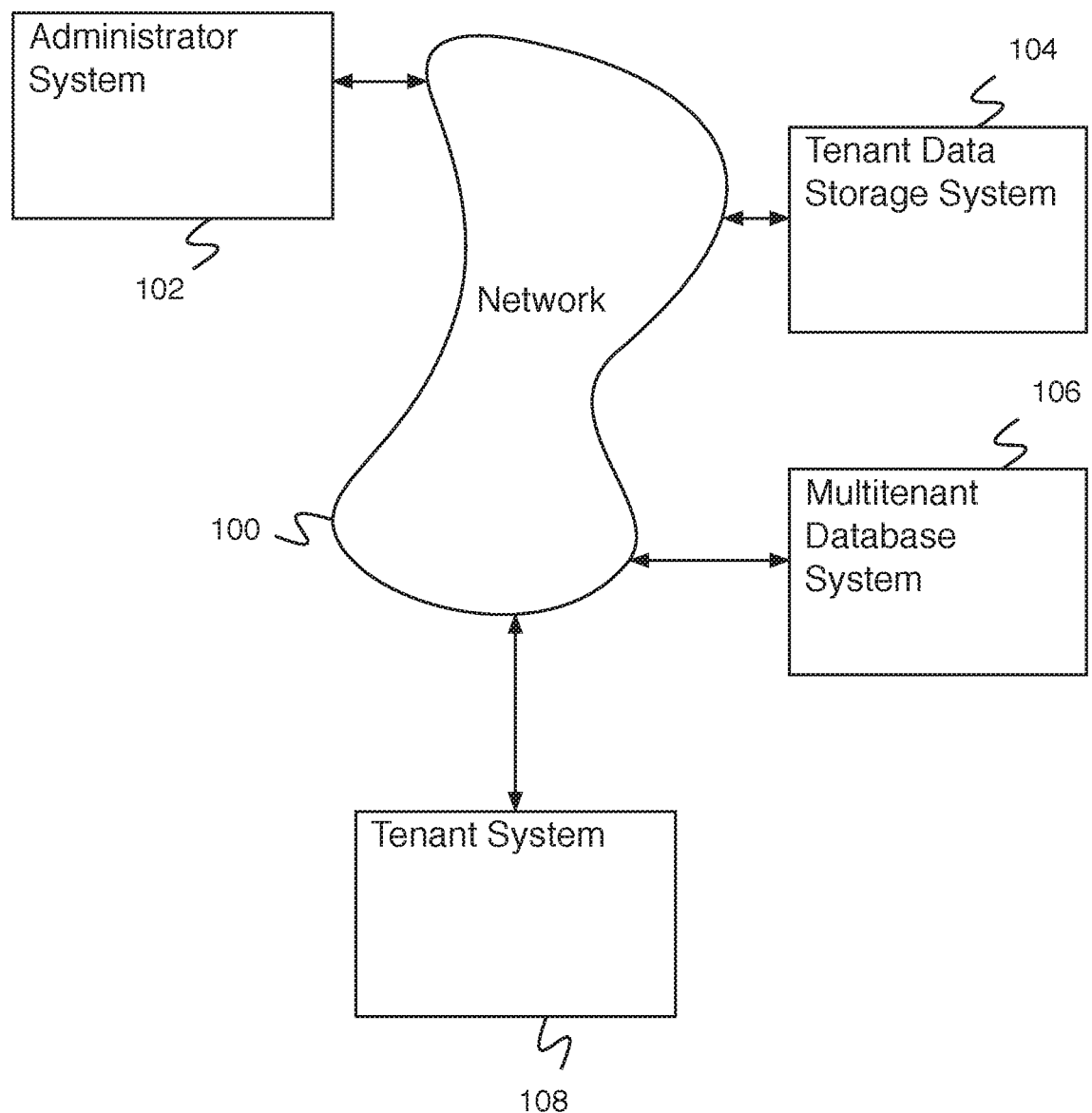
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a metadata driven catalog definition is disclosed. The system comprises an interface and a processor. The interface is configured to receive an indication to generate a catalog. The processor is configured to traverse a set of data to generate a set of metadata tags; determine a set of sub-categories, wherein a subcategory of the set of subcategories comprises a group of metadata tags associated with the sub-category; determine a set of categories, wherein a category of the set of categories comprises a group of sub-categories associated with the category; and provide the catalog comprising a set of filters for filtering data according to the set of categories and the set of sub-categories. In some embodiments, the system for a metadata driven catalog definition additionally comprises a memory coupled to the processor and configured to provide the processor with instructions.

A system for a metadata driven catalog definition comprises a system for generating a set of metadata based filters. The metadata-based filters are filters for filtering data objects by metadata tags associated with the data objects. Data objects are stored in an object based database and comprise data attributes (e.g., data values associated with a data object) and data relations (e.g., links to other data objects). Some data attributes or relations comprise metadata tags. The system for a metadata driven catalog definition first determines a set of all metadata tags in the object-based database. The object-based database is traversed (e.g., using a depth-first traversal, using a breadth-first traversal, using a recursive traversal, etc.) to build the set of metadata tags. A set of sub-categories is then determined, each sub-category comprising a set of one or more metadata tags, and a set of categories is determined, each category comprising a set of one or more sub-categories.

A system user (e.g., a user representing a tenant) provides a set of opt-in and opt-out indications corresponding to the categories and sub-categories of the catalog. A set of opt-out metadata tags is determined from the set of opt-in and opt-out indications and used to create a set of filters for filtering data objects. Any data object associated with an opt-out metadata tag is prevented from passing through the set of metadata-based filters. The set of metadata-based filters is applied by a system for commingled data analysis when transferring data from a tenant data storage to a commingled data storage (e.g., preventing the system from storing any data associated with opt-out categories or sub-categories from being stored on the commingled data storage). A set of opt-in metadata tags is determined from the set of opt-in and opt-out indications and used to create a set of filters for filtering data objects. Any data object associated with an opt-in metadata tag is allowed to pass through the set of metadata-based filters. The set of metadata-based filters is applied by a system for commingled data analysis when transferring data from a tenant data storage to a commingled data storage (e.g., preventing the system from storing any data associated with opt-out categories or sub-categories from being stored on the commingled data storage and allowing the system to store data associated with opt-in categories or sub-categories to be stored on the commingled data storage). The set of metadata based filters is additionally applied by the system for commingled data analysis when providing report data (e.g., report data provided to a tenant user is filtered using the set of metadata based filters, preventing the tenant from viewing other tenants' data associated with categories or sub-categories it has opted out of—for example, to enforce that a tenant does not receive data of data types that it is not willing to share).

FIG. 1 is a block diagram illustrating an embodiment of a network system. In some embodiments, the network system of FIG. 1 comprises a system for a metadata driven catalog definition. In the example shown, tenant data storage system 104 comprises a system for a metadata driven catalog definition. The catalog includes a set of metadata-based filters for identifying data subsets. The set of metadata-based filters comprises a set of groups of metadata tags that are included or excluded in a filtering operation; each filter identifies data objects associated with any of its associated metadata tags. Creating a category comprises selecting the metadata tags that form the group of metadata tags associated with the category. Creating a sub-category comprises selecting the metadata tags that form the group of metadata tags associated with the sub-category. The catalog definition further includes a definition of a group of sub-categories included in the categories.

Tenant data storage system 104 initially receives an indication to generate a catalog (e.g., from administrator system 102, from tenant system 108, etc.). Tenant data storage system 104, using its processor, traverses a set of data stored by a plurality of tenant data storage units. Tenant data storage system 104 determines metadata tags associated with each piece of stored data to create the set of metadata tags. The system then groups metadata tags into sub-categories and groups of sub-categories into categories. The catalog includes the listing of categories, sub-categories, and the metadata tags, and has filters associated with these categories, sub-categories, and the metadata tags. The catalog is provided to a tenant using tenant system 108 and opt-in and opt-out information associated with the catalog is requested from the tenant. Opt-in and opt-out information associated with the catalog comprises an indication associated with each sub-category indicating whether the tenant opts-in to share data associated with the sub-category. The catalog and one or more sets of tenant opt-in information are additionally provided to a process for secure data transfer and a process for reporting. The process for secure data transfer transfers data from a tenant data storage unit to a commingling storage unit indicated by the tenant as opt-in data without transferring any data indicated by the tenant as opt-out data. The process for reporting generates a report for a tenant and filters from the report data indicated by the tenant as opt-out data.

Administrator system 102 comprises an administrator system for use by an administrator. An administrator uses administrator system 102 to access tenant data storage system 104 and multitenant database system 106 to perform setup and configuration commands, to query a system state, to indicate to rebuild a catalog, to indicate to rebuild an analysis database, or to perform any other appropriate administrator action. Tenant system 108 comprises a tenant system for use by a tenant (e.g., a client of multitenant database system 106). A tenant uses tenant system 108 to access multitenant database system 106 to perform tenant database functions (e.g., providing data, querying a database, running reports, etc.). A tenant additionally uses tenant system 108 to access tenant data storage system 104 to interact with an analysis database (e.g., providing opt-in and opt-out information, requesting data analyses, etc.).

Tenant data storage system 104 comprises a tenant data storage system for storing data in a database for a set of tenants. Tenant data storage system 104 comprises a set of distinct tenanted storage systems (for example—separate hard drives, separate virtual machines, etc.) for storing tenant data in such a way that tenants cannot access each other's data. Tenant data storage system 104 additionally comprises a commingling storage system for storing commingled tenant data for analysis purposes. Tenant data storage system 104 additionally comprises a secure data commingling system for managing data transfer from the tenanted storage systems to the commingling storage and for executing data analyses and reporting on the commingling storage unit. Multitenant database system 106 comprises a system for performing database actions (e.g., storing data, modifying data, querying data, performing reports, etc.) on tenant data stored by tenant data storage system 104.

FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. In some embodiments, the network system of FIG. 1 comprises a plurality of tenant systems associated with one or more tenants.

Figure 2A:
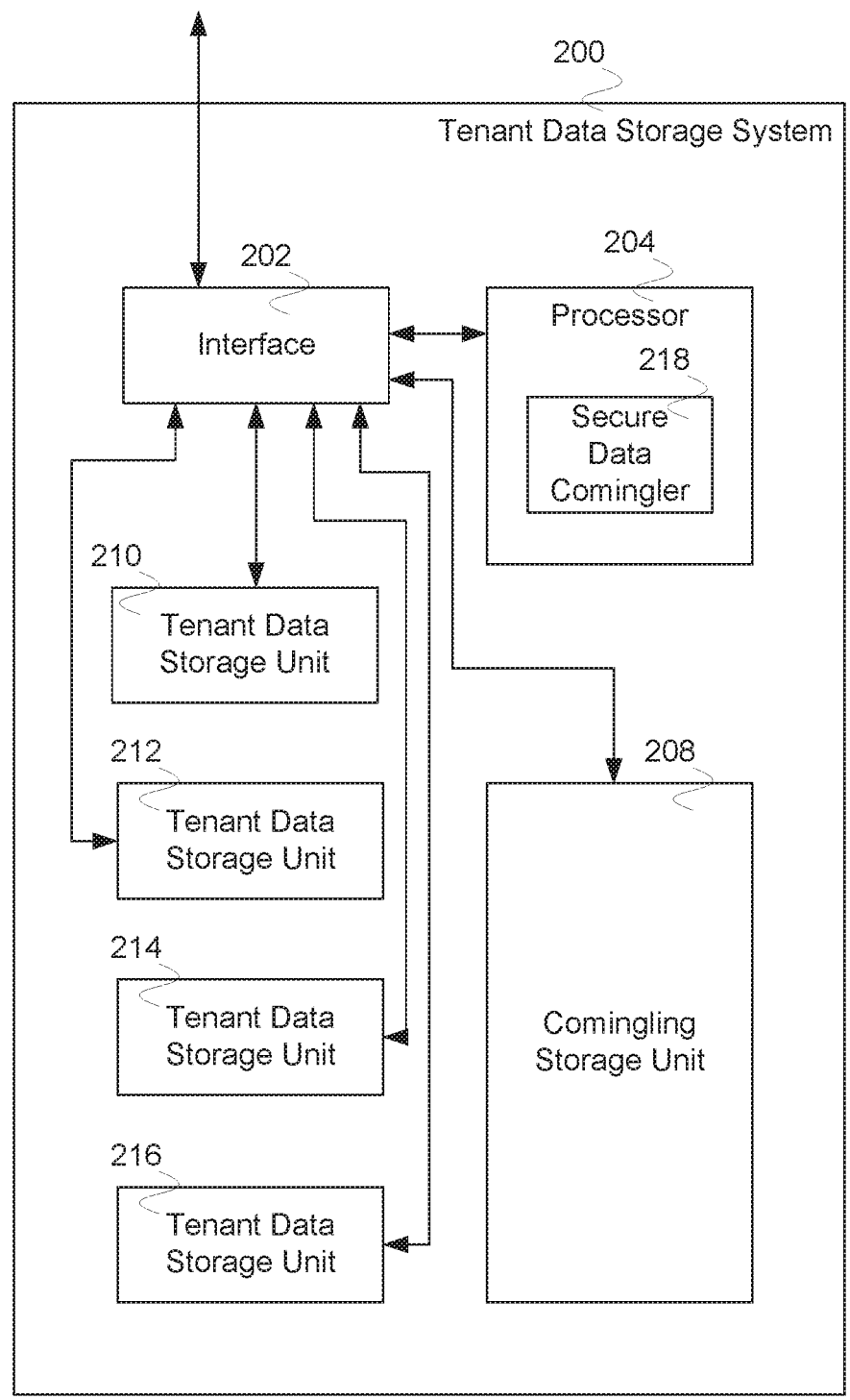
FIG. 2A is a block diagram illustrating an embodiment of a tenant data storage system.

FIG. 2A is a block diagram illustrating an embodiment of a tenant data storage system. In some embodiments, tenant data storage system 200 comprises tenant data storage system 104 of FIG. 1. In the example shown, tenant data storage system 200 comprises tenant data storage unit 210, tenant data storage unit 212, tenant data storage unit 214, and tenant data storage unit 216. Each tenant data storage unit is associated with a different tenant and stores data for its associated tenant. Tenant data storage system 200 additionally comprises commingling storage unit 208 for storing commingled tenant data. Tenant data storage system 200 additionally comprises interface 202 for communicating with other systems and internally to tenant data storage system 200 between storage units and processor 204. Processor 204 includes secure data commingler 218. Secure data commingler 218 comprises a system for generating a catalog based at least in part on tenant data. The catalog comprises a set of data categories and sub-categories each associated with a set of metadata tags that allows data to be filtered using the categories and sub-categories. A tenant is prompted for a set of opt-in and opt-out information indicating whether data associated with each sub-category should be filtered when data is filtered using the catalog.

In some embodiments, secure data commingler 218 comprises a system for filtering data stored in tenant data storage units based at least in part on the catalog and storing filtered data in commingling storage unit 208. In some embodiments, tenant data is transferred upon request (e.g., a tenant request, an administrator request, etc.). In some embodiments, secure data commingler 218 comprises a system for creating a report based on data stored in commingling storage unit 208 and filtering the report data based at least in part on the catalog. In some embodiments, data stored on commingling storage unit 208 is used for a service (e.g., determination of statistics, reporting, benchmarking, etc.). In some embodiments, secure data commingler 218 comprises a system for determining a set of tenants associated with the tenant data stored on commingling storage unit 208.

In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way. In various embodiments, tenant data storage system 200 comprises 1, 2, 5, 22, 89, or any other appropriate number of tenant data storage units.

Figure 2B:
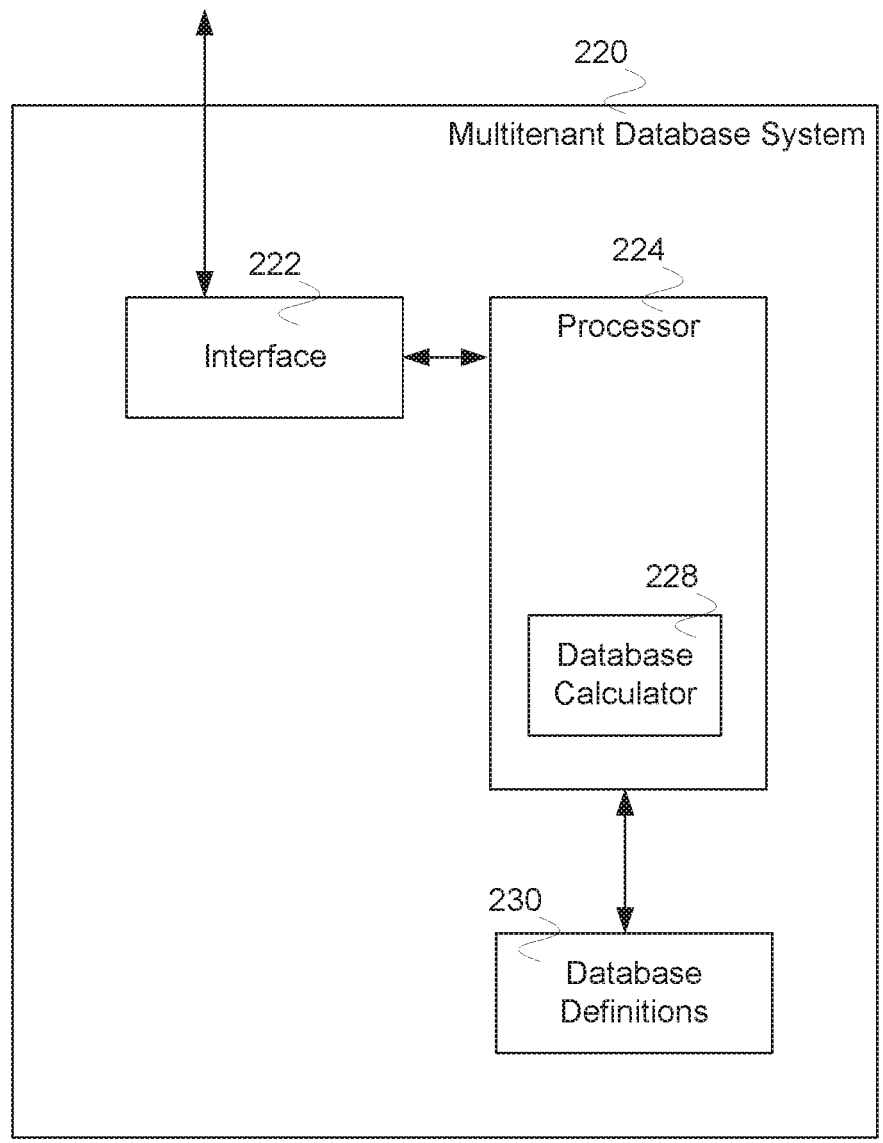
FIG. 2B is a block diagram illustrating an embodiment of a multitenant database system.

FIG. 2B is a block diagram illustrating an embodiment of a multitenant database system. In some embodiments, multitenant database system 220 is used to implement multitenant database system 106 of FIG. 1 with tenant data storage system of FIG. 2A. In the example shown, a multitenant database system 220 receives a request, via interface 222, from a user for a service that uses multitenanted data. Database calculator 228 of processor 224 using database definitions 230 causes a report to be determined using data stored in a commingling storage unit and provides the report to the user. The calculation associated with the service is performed using processor 224 or is outsourced to be performed by another processor (e.g., a processor associated with a tenant data storage unit). The data determined to be associated with the calculation is first evaluated for access associated both with the data and the requestor.

Figure 3:
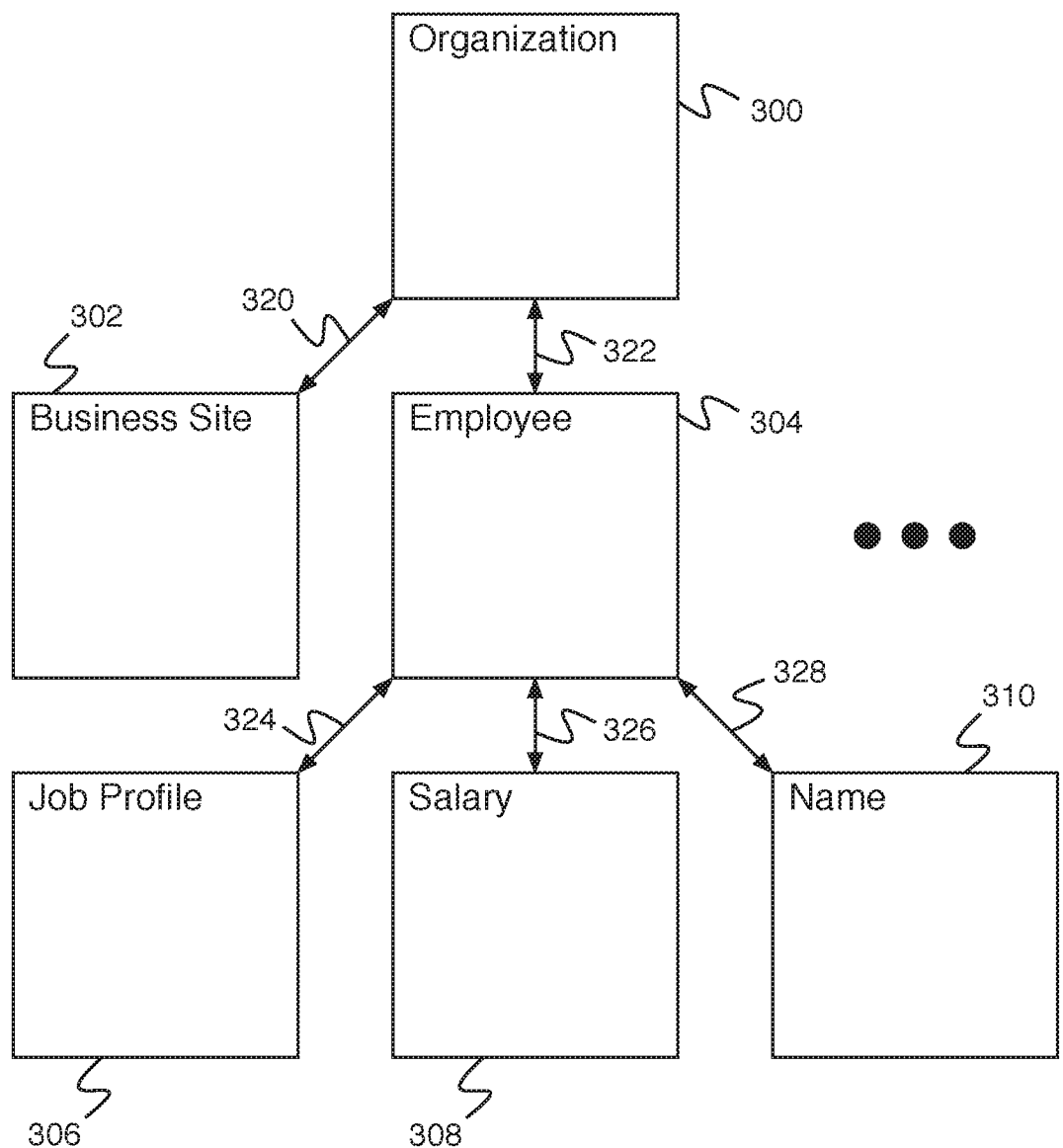
FIG. 3 is a diagram illustrating an embodiment of a data structure for an object tree.

FIG. 3 is a diagram illustrating an embodiment of a data structure for an object tree. In some embodiments, the object tree of FIG. 3 comprises stored data in a database system (e.g., in a tenant data storage unit of FIG. 2A). Objects 300, 302, 304, 306, 308, and 310 comprise instances of object data structures. Relations 320, 322, 324, 326, and 328 comprise object relations (e.g., associations between objects). The object instances of FIG. 3 describe part of a business data structure. Organization 300 has relation 320 to business site object instance 302. Business site object instance 302 contains the name of the site at which the organization resides. Organization 300 also has relation 322 to employee object instances including employee object instance 304, each representing an employee that is part of the organization. Employee object instance 304 has relation 324, relation 326, and relation 328 to job profile object instance 306, salary object instance 308, and name object instance 310, respectively. Objects comprise stored data. Objects can additionally store metadata tags describing the object. In various embodiments, a metadata data is stored in a way representing the organizational structure of the company. In some embodiments, programs can access and store attribute data by traversing the object tree along the connections between object instances given by relationships, and operate on the stored attribute data to create a report comprising organization data. In various embodiments, a metadata tag comprises a label associated with a data instance, a relation associated with a data instance (e.g., a relation to a tagged object), data associated with a data instance, or any other appropriate metadata tag.

FIG. 4 is a diagram illustrating an embodiment of a catalog as presented to a tenant. In some embodiments, the catalog of FIG. 4 is generated by a tenant data storage system (e.g., tenant data storage system 104 of FIG. 1) using a metadata driven catalog definition. In the example shown, set of categories 400 is presented. Each category comprises a name and an opt-in indication, allowing a tenant to opt-in to an entire data category at once. In the event a user makes an indication to a category name, a set of sub-categories is presented. In the example shown, workforce composition sub-categories 402 is presented. Each sub-category comprises a name and an opt-in indication, allowing a tenant to opt-in to the sub-category. In the event a user indicates to opt-in to a category, all sub-categories of the category are opted in. In some embodiments, the catalog of FIG. 4 is used to create a set of filters. A filter for filtering data according to a sub-category comprises a filter for identifying data associated with one or more metadata tags associated with the sub-category. In some embodiments, a filter for filtering data according to a category comprises a filter for identifying data associated with one or more sub-categories associated with the category.

In some embodiments, an example category comprises leadership and management effectiveness with subcategories of span of control and leadership. For the subcategory of span of control, the benchmark comprises a calculation of an average number of direct reports within an organization. For the subcategory of leadership, benchmarks comprise percentage female leaders, percentage male leaders, percentage all leaders, and ratio of male to female leaders.

In some embodiments, an example category comprises turnover with subcategories of terminations and talent. For the subcategory of terminations, the benchmarks comprise overall turnover, voluntary turnover, and involuntary turnover. For the subcategory of talent, the benchmarks comprise high potential total turnover, high potential voluntary turnover, and high potential involuntary turnover.

In some embodiments, an example category comprises usage with subcategories of system utilization, business process, headcount, diversity, age, and length of service. For the subcategory of system utilization, the benchmarks comprise count of custom reports and count of customer-defined calculated fields. For the subcategory of business process, the benchmarks comprise count of business process definitions, average steps in business process definitions, and average number of days to complete business process. For the subcategory of headcount, the benchmarks comprise percent contingent workers and percent active workers. For the subcategory of diversity, the benchmark comprises male to female ratio. For the subcategory of age, the benchmark comprise average retirement age, percentage retirement for those of retirement age, and average age of worker. For the subcategory of length of service, the benchmarks comprise female percentage, male percentage, average length of service, average time in job profile, and average time in position.

Figure 5:
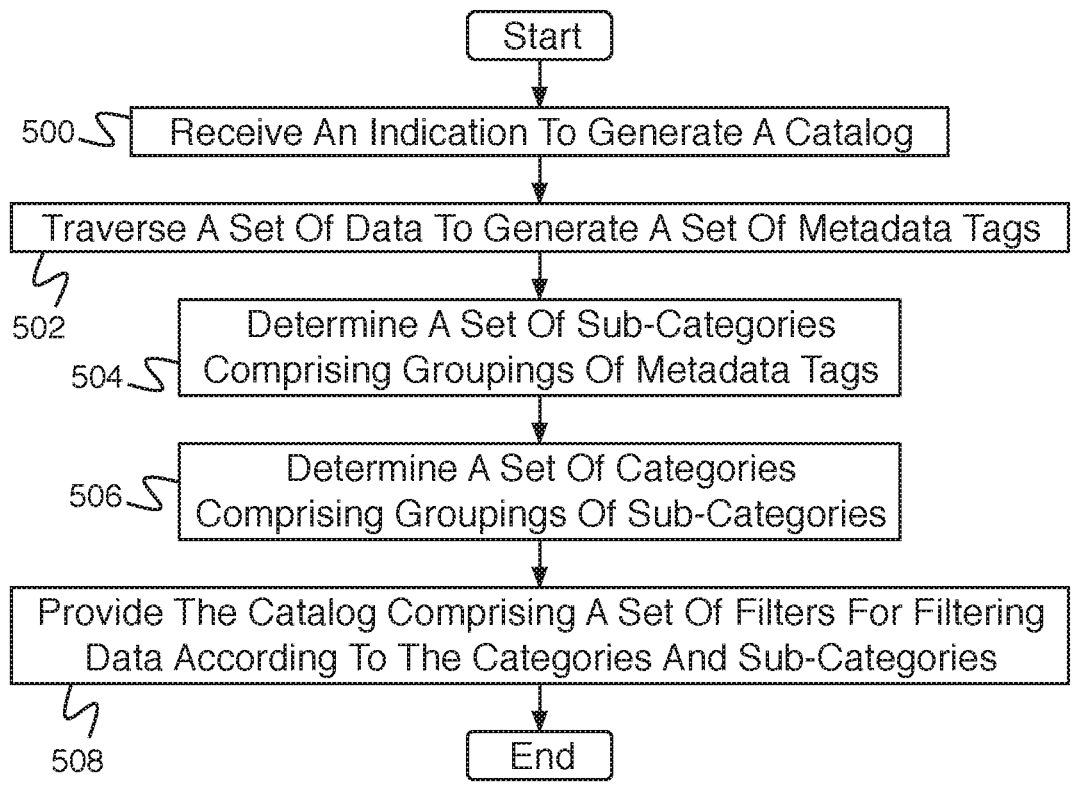
FIG. 5 is a flow diagram illustrating an embodiment of a process for a metadata driven catalog definition.

FIG. 5 is a flow diagram illustrating an embodiment of a process for a metadata driven catalog definition. In some embodiments, the process of FIG. 5 is executed by a tenant data storage system (e.g., tenant data storage system 104 of FIG. 1). In the example shown, in 500, an indication to generate a catalog is received. The indication to generate a catalog comprises an indication to generate an initial catalog (e.g., in the event a catalog has not previously been generated) or a new catalog (e.g., in the event it is determined that the catalog needs to be regenerated). In 502 a set of data is traversed to generate a set of metadata tags. The set of all metadata tags comprises a set of all metadata tags found in a set of user data—for example, data belonging to a tenant or data belonging to a group of tenants. Metadata tags provide a tool for filtering data (e.g., a group of related data objects can be identified by identifying all data associated with a given metadata tag). In 504, a set of sub-categories comprising groupings of metadata tags is determined. Sub-categories identifying sets of related data are created by grouping sets of related metadata tags. A sub-category filter can be used to filter the data to identify a set of data instances, wherein each data instance identified by the sub-category filter is associated with one or more metadata tags of the sub-category. In 506, a set of categories comprising groupings of sub-categories is determined. Categories identifying sets of related data are created by grouping sets of related sub-categories. A category filter can be used to filter the data to identify a set of data instances, wherein each data instance identified by the category filter is associated with one or more metadata tags of one or more of the sub-categories associated with the category. In 508, the catalog comprising a set of filters for filtering data according to the categories and sub-categories is provided.

In some embodiments, the set of metadata tags generated in 502 additionally comprises a structure based at least in part on the data traversal (e.g., data is stored in a data structure, e.g., a tree, a table, etc., and the metadata tags are stored in a related structure). In some embodiments, the set of sub-categories determined in 504 is determined automatically (e.g., the set of groupings of metadata tags is determined by an automatic process using a predefined table or set of rules). In various embodiments, the set of sub-categories determined in 504 is determined using machine learning, using a clustering algorithm, using a structure determined during a data traversal, or in any other appropriate way. In some embodiments, the set of sub-categories determined in 504 is determined manually (e.g., by receiving a manually indicated set of groupings of metadata tags). In some embodiments, the set of categories determined in 506 is determined automatically (e.g., the set of groupings of sub-categories is determined by an automatic process). In various embodiments, the set of categories determined in 506 is determined using machine learning, using a clustering algorithm, using a structure determined during a data traversal, or in any other appropriate way. In some embodiments, the set of categories determined in 506 is determined manually (e.g., by receiving a manually indicated set of groupings of sub-categories). In various embodiments, the catalog is provided in 508 to a user for indicating opt-in information, to a process for transferring data to a commingling storage unit, to a process for reporting, or to any other appropriate location. In some embodiments, data is filtered using the set of filters before it is transferred from a tenant data storage unit to a commingling storage unit (e.g., to protect data the tenant does not wish to share). In some embodiments, report data is filtered using the set of filters of the catalog before providing the report data as part of a report (e.g., to enforce that a tenant does not receive data of data types that it is not willing to share).

Figure 6:
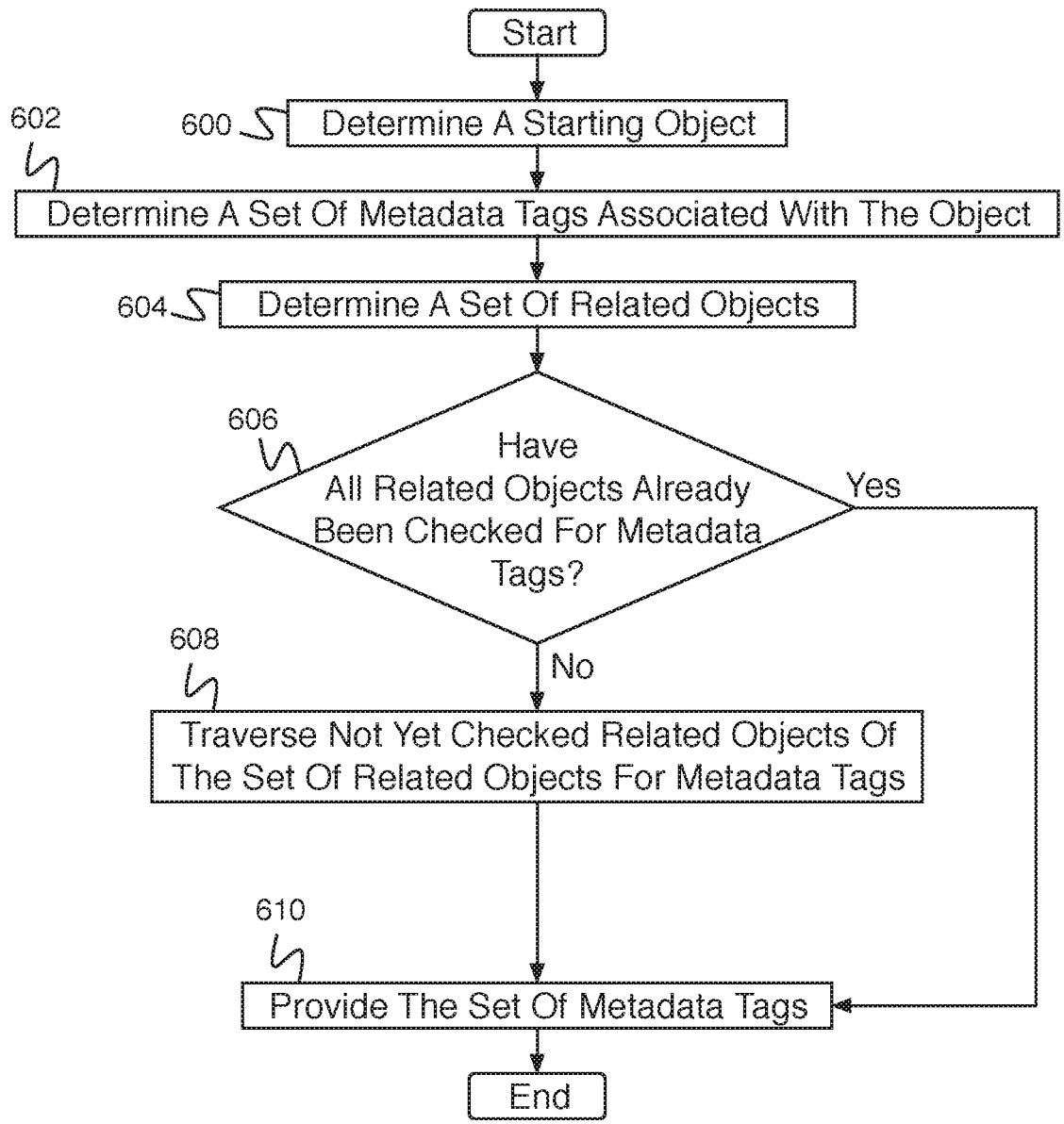
FIG. 6 is a flow diagram illustrating an embodiment of a process for traversing a set of data to generate a set of metadata tags.

FIG. 6 is a flow diagram illustrating an embodiment of a process for traversing a set of data to generate a set of metadata tags. In some embodiments, the process of FIG. 6 implements 502 of FIG. 5. In the example shown, in 600, a starting object is determined. For example, a starting object comprises an object for starting a data traversal. In 602, a set of metadata tags associated with the object is determined. For example, by reading the data object and determining all associated data values that are metadata tags. In 604, a set of related objects is determined. In 606, it is determined whether all related objects have already been checked for metadata tags. In the event it is determined that all related objects have already been checked for metadata tags, control passes to 610. In the event it is determined in 606 that all related objects have not already been checked for metadata tags, control passes to 608. In 608, not yet checked related objects of the set of related objects are traversed for metadata tags (e.g., using the process of FIG. 6). Control then passes to 610. In 610, the set of metadata tags is provided, and the process ends.

In some embodiments, traversing not yet checked related objects of the set of related objects using the process of FIG. 6 comprises a recursive call. In various embodiments, objects are traversed recursively, iteratively, linearly (e.g., in a data table), breadth-first, depth-first, or in any other appropriate way. In various embodiments, selected data is automatically determined as opted-out and, when encountered during traversal, the metadata tags are not included in the set of metadata tags, are not included in catalog, are not included in categories, are not included in sub-categories, or any other manner of automatically not including in data transferred to commingled data storage.

Figure 7:
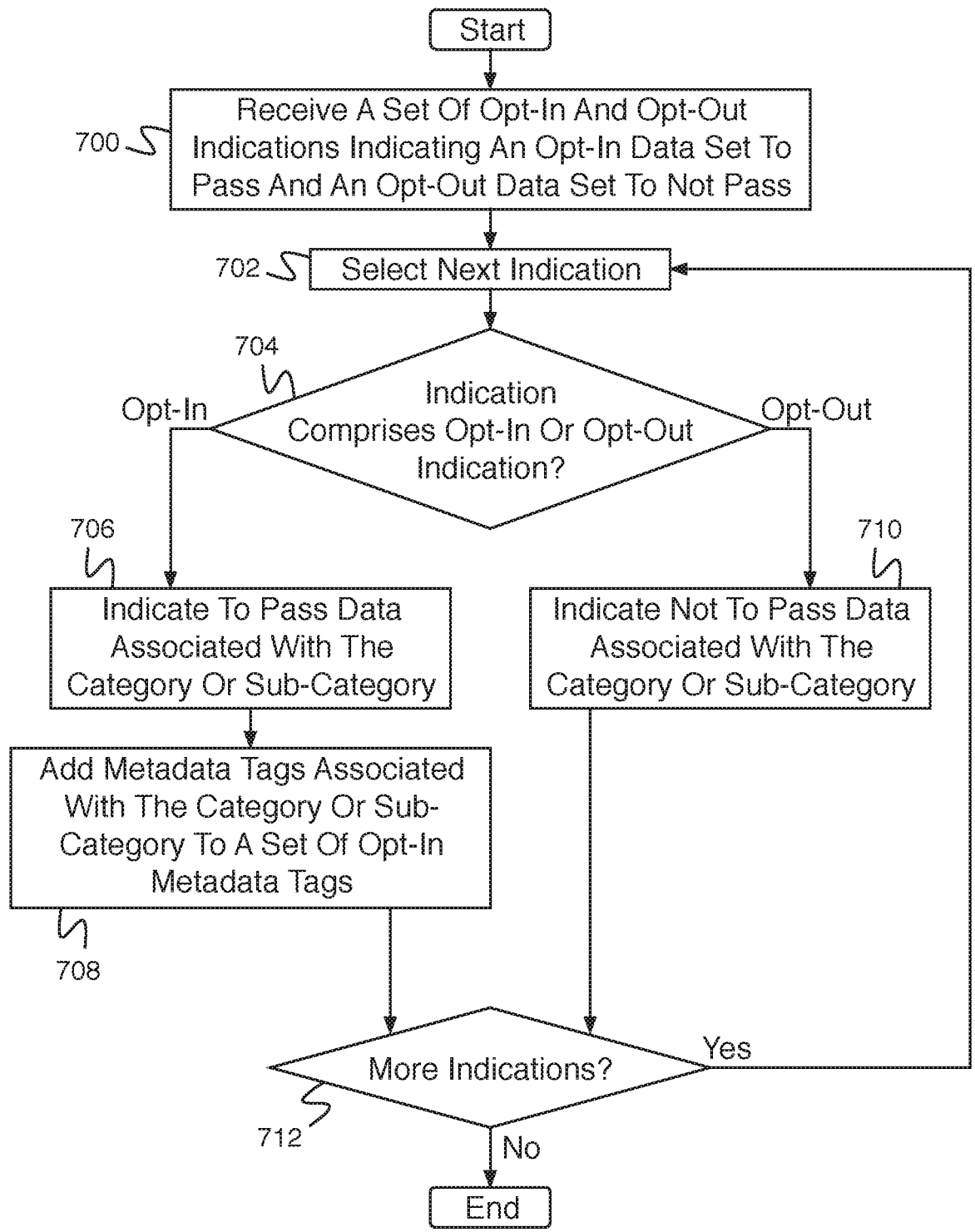
FIG. 7 is a flow diagram illustrating an embodiment of a process for configuring a catalog filter.

FIG. 7 is a flow diagram illustrating an embodiment of a process for configuring a catalog filter. In some embodiments, the process of FIG. 7 is executed by a tenant data storage system (e.g., tenant data storage system 104 of FIG. 1) for configuring a filter. In the example shown, in 700, a set of opt-in and opt-out indications indicating an opt-in data set to pass and an opt-out data set to not pass is received. Each indication of the set of opt-in and opt-out indications is associated with a category or sub-category of a catalog. In 702, a next indication (e.g., of the set of indications) is selected. In some embodiments, the next indication comprises the first indication. In 704, it is determined whether the indication comprises an opt-in indication or an opt-out indication. In the event it is determined that the indication comprises an opt-in indication, control passes to 706. In 706, it is indicated to pass data associated with the category or sub-category (e.g., associated with the indication). In 708, metadata tags associated with the category or sub-category are added to a set of opt-in metadata tags. Control then passes to 712. In the event it is determined in 704 that the indication comprises an opt-out indication, control passes to 710. In 710, it is indicated not to pass data associated with the category or sub-category (e.g., associated with the indication). Control then passes to 712. In 712, it is determined whether there are more indications. In the event it is determined that there are more indications, control passes to 702. In the event it is determined that there are not more indications, the process ends.

In some embodiments, the set of opt-in and opt-out indications indicating an opt-in data set to pass and an opt-out data set to not pass is received as a result of a tenant using a tenant system interacting with a catalog.

Figure 8:
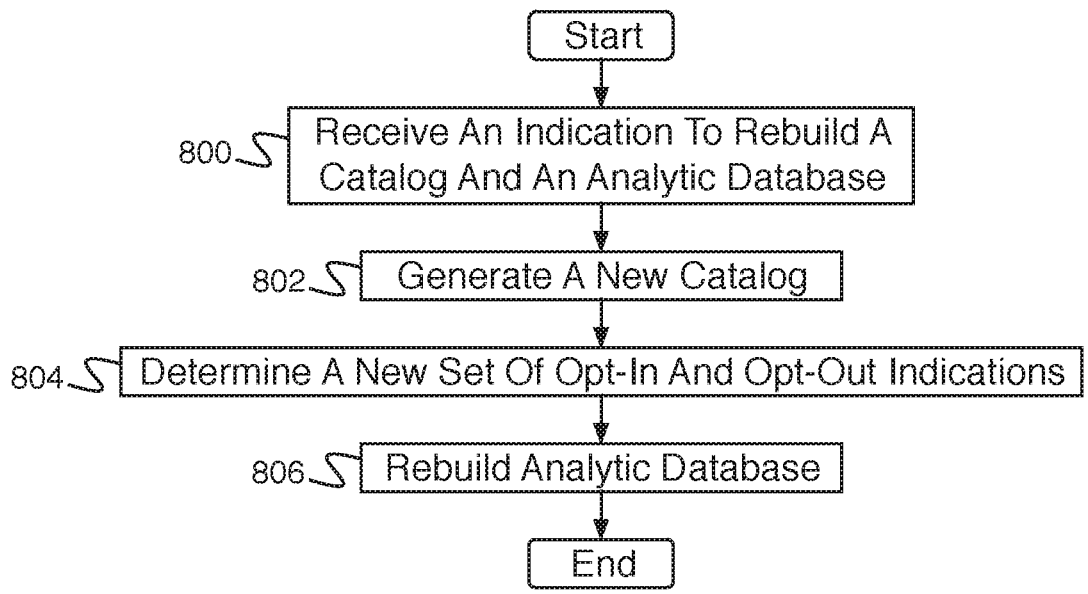
FIG. 8 is a flow diagram illustrating an embodiment of a process for rebuilding a catalog and an analytic database.

FIG. 8 is a flow diagram illustrating an embodiment of a process for rebuilding a catalog and an analytic database. In some embodiments, the process of FIG. 8 is executed by a tenant data storage system (e.g., tenant data storage system 104 of FIG. 1). In the example shown, in 800, an indication is received to rebuild a catalog and an analytic database. In 802, a new catalog is generated (e.g., using the process of FIG. 5). In 804, a new set of opt-in and opt-out indications is determined (e.g., a new set of opt-in and opt-out indications corresponding to the new catalog). In 806, the analytic database is rebuilt (e.g., utilizing the new catalog and new set of opt-in and opt-out indications corresponding to the new catalog to determine shared data).

In some embodiments, it is determined (e.g., by a system administrator, by the tenant data storage system) that tenant data has changed enough such that the catalog and analytic database need to be rebuilt. In various embodiments, tenant data changes because a new tenant joins the system, because a new data type is added, because the database is restructured, or for any other appropriate reason. In some embodiments, determining a new set of opt-in and opt-out indications comprises automatically determining a new set of opt-in and opt-out indications. In some embodiments, a new set of opt-in and opt-out indications is based at least in part on a previous set of opt-in and opt-out indications associated with a previous catalog. In some embodiments, when a new set of opt-in and opt-out indications is automatically determined, it is automatically determined in such a way that only metadata tags that were opted into in the previous set of opt-in and opt-out indications are opted into in the new set of opt-in and opt-out indications. In some embodiments, after a new set of opt-in and opt-out indications is automatically determined, a user is prompted to update the set of opt-in and opt-out indications (e.g., in the event the user desires to change any of the opt-in and opt-out settings).

Figure 9:
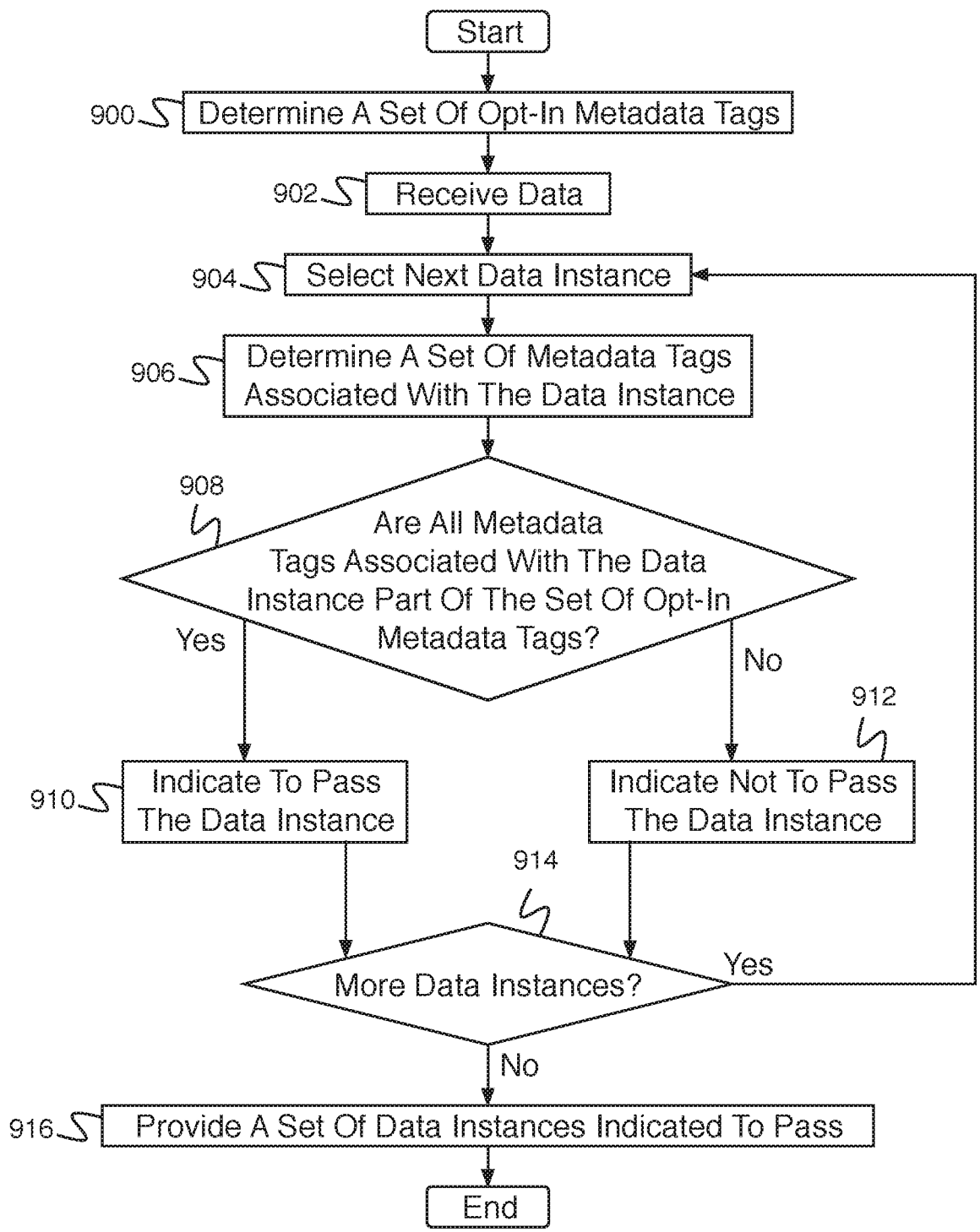
FIG. 9 is a flow diagram illustrating an embodiment of a process for filtering data according to a catalog.

FIG. 9 is a flow diagram illustrating an embodiment of a process for filtering data according to a catalog. In some embodiments, the process of FIG. 9 is executed by a tenant data storage system (e.g., tenant data storage system 104 of FIG. 1). In the example shown, in 900, a set of opt-in metadata tags is determined (e.g., a set of opt-in metadata tags corresponding to a set of opt-in categories and sub-categories). In 902, data is received. In 904, a next data instance is selected. In some embodiments, the next data instance comprises the first data instance. In 906, a set of metadata tags associated with the data instance is determined. In 908, it is determined whether all metadata tags associated with the data instance are part of the set of opt-in metadata tags. In the event it is determined that all metadata tags associated with the data instance are part of the set of opt-in metadata tags, control passes to 910. In 910, it is indicated to pass the data instance. Control then passes to 914. In the event it is determined that all metadata tags associated with the data instance are not part of the set of opt-in metadata tags, control passes to 912. In 912, it is indicated not to pass the data instance. In 914, it is determined whether there are more data instances (e.g., of the received data). In the event it is determined that there are more data instances, control passes to 904. In the event it is determined that there are not more data instances, control passes to 916. In 916, a set of data instances indicated to pass is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a metadata driven catalog definition, comprising:
    an interface configured to receive an indication to generate a catalog comprising a set of filters; and
    a processor configured to:
        generate the catalog comprising the set of filters, wherein to generate the catalog comprising the set of filters, the processor is configured to:
            traverse a set of data associated with a tenant to generate a set of metadata tags, wherein the set of data associated with the tenant is stored in a tenant data storage unit, wherein a metadata tag indicates a category or sub-category to which data associated with the metadata tag belongs;
            determine a set of sub-categories based on the set of metadata tags, wherein a sub-category of the set of subcategories comprises a group of metadata tags associated with the sub-category; and
            determine a set of categories based on the set of metadata tags, wherein a category of the set of categories comprises a group of sub-categories associated with the category;
        provide to a system associated with the tenant the catalog comprising the set of filters for filtering data according to the set of categories and the set of sub-categories;
        receive from the system associated with the tenant one or more indications associated with the set of categories and the set of sub-categories, wherein the one or more indications indicate whether data associated with a category of the set of categories or data associated with a sub-categories of the set of sub-categories is to be included in a transfer of data associated with the tenant from the tenant data storage unit to a commingled storage unit;
        provide, from the tenant data storage unit to the commingled storage unit, the data associated with the tenant that is indicated to be included in the transfer, wherein the data associated with the tenant stored in the tenant data storage system is stored separately from data associated with one or more other tenants, wherein the data associated with the one or more other tenants is stored in one or more corresponding tenant data storage units, and wherein data associated with the tenant included in the transfer is stored and mixed together with data associated with one or more other tenants in the commingled storage unit;
        filter report data using the set of filters to obtain filtered report data, wherein filtering the report data does not pass data associated with an other tenant of the one or more other tenants; and
        provide the filtered report data to the tenant.

2. The system of claim 1, wherein an instance of data of the set of data is associated with one or more metadata tags.

3. The system of claim 2, wherein the metadata tag of the one or more metadata tags comprises a label associated with the instance of data.

4. The system of claim 2, wherein the metadata tag of the one or more metadata tags comprises a relation associated with the instance of data.

5. The system of claim 1, wherein the processor is further configured to determine whether an instance of data of the set of data comprises automatically opted-out data.

6. The system of claim 5, wherein in the event that it is determined that an instance of data comprises automatically opted-out data, no metadata tags are generated associated with the instance of data.

7. The system of claim 1, wherein the set of metadata tags is organized according to an order that the set of data is traversed.

8. The system of claim 1, wherein filtering data according to the sub-category comprises identifying data associated with the group of metadata tags associated with the sub-category.

9. The system of claim 1, wherein filtering data according to the category comprises identifying data associated with the group of sub-categories associated with the category.

10. The system of claim 1, wherein the processor is further configured to:
receive an opt-in indication associated with an opt-in filter selection; and
indicate to pass data as filtered using the opt-in filter selection.

11. The system of claim 10, wherein the opt-in indication is one of a plurality of opt-in indications.

12. The system of claim 1, wherein the processor is further configured to:
receive an opt-out indication associated with an opt-out filter selection; and
indicate to not pass data as filtered using the opt-out filter selection.

13. The system of claim 12, wherein the opt-out indication is one of a plurality of opt-out indications.

14. The system of claim 1, wherein the processor is further configured to:
filter tenant data using the set of filters of the catalog before transferring data from the tenant data storage unit to the commingling storage unit.

15. The system of claim 1, wherein the processor is further configured to:
generate a set of opt-in indications and a set of opt-out indications associated with the catalog based at least in part on a previous set of opt-in indications and a previous set of opt-out indications associated with a previous catalog.

16. The system of claim 15, wherein the processor is further configured to:
prompt a user to update the set of opt-in indications and the set of opt-out indications.

17. The system of claim 1, wherein the group of metadata tags associated with the sub-category is indicated by a user.

18. The system of claim 1, wherein the group of sub-categories associated with the category is indicated by the user.

19. The system of claim 1, wherein the group of metadata tags associated with the sub-category is determined automatically.

20. The system of claim 1, wherein the group of sub-categories associated with the category is determined automatically.

21. The system of claim 1, wherein filtering the report data comprises determining that the data associated with the other tenant is not associated with a category of the set of categories or a sub-category of the set of sub-categories indicated by the tenant to be included in the transfer of data.

22. A method for a metadata driven catalog definition, comprising:
receiving an indication to generate a catalog comprising a set of filters;
generating the catalog comprising the set of filters, wherein generating the catalog comprises:
traversing, using a processor, a set of data associated with a tenant to generate a set of metadata tags, wherein the set of data associated with the tenant is stored in a tenant data storage unit, wherein a metadata tag indicates a category or sub-category to which data associated with the metadata tag belongs;
determining a set of sub-categories based on the set of metadata tags, wherein a sub-category of the set of subcategories comprises a group of metadata tags associated with the sub-category; and
determining a set of categories based on the set of metadata tags, wherein a category of the set of categories comprises a group of sub-categories associated with the category;
providing to a system associated with the tenant the catalog comprising the set of filters for filtering data according to the set of categories and the set of sub-categories;
receiving from the system associated with the tenant one or more indications associated with the set of categories and the set of sub-categories, wherein the one or more indications indicate whether data associated with a category of the set of categories or data associated with a sub-categories of the set of sub-categories is to be included in a transfer of data associated with the tenant from the tenant data storage unit to a commingled storage unit;
providing, from the tenant data storage unit to the commingled storage unit, the data associated with the tenant that is indicated to be included in the transfer, wherein the data associated with the tenant stored in the tenant data storage unit is stored separately from data associated with one or more other tenants, wherein the data associated with the one or more other tenants is stored in one or more corresponding tenant data storage units, and wherein data associated with the tenant included in the transfer is stored and mixed together with data associated with one or more other tenants in the commingled storage unit;
filtering report data using the set of filters to obtain filtered report data, wherein filtering the report data does not pass data associated with an other tenant of the one or more other tenants; and
providing the filtered report data to the tenant.

23. A computer program product for a metadata driven catalog definition, the computer program product being embodied in a non-transitory computer readable storage medium and comprising computer instructions for:
receiving an indication to generate a catalog comprising a set of filters;
generating the catalog comprising the set of filters, wherein generating the catalog comprises:
traversing, using a processor, a set of data associated with a tenant to generate a set of metadata tags, wherein the set of data associated with the tenant is stored in a tenant data storage unit, wherein a metadata tag indicates a category or sub-category to which data associated with the metadata tag belongs;
determining a set of sub-categories based on the set of metadata tags, wherein a sub-category of the set of subcategories comprises a group of metadata tags associated with the sub-category; and
determining a set of categories based on the set of metadata tags, wherein a category of the set of categories comprises a group of sub-categories associated with the category;
providing to a system associated with the tenant the catalog comprising the set of filters for filtering data according to the set of categories and the set of sub-categories;
receiving from the system associated with the tenant one or more indications associated with the set of categories and the set of sub-categories, wherein the one or more indications indicate whether data associated with a category of the set of categories or data associated with a sub-categories of the set of sub-categories is to be included in a transfer of data associated with the tenant from the tenant data storage unit to a commingled storage unit;

providing, from the tenant data storage unit to the commingled storage unit, the data associated with the tenant that is indicated to be included in the transfer, wherein the data associated with the tenant stored in the tenant data storage unit is stored separately from data associated with one or more other tenants, wherein the data associated with the one or more other tenants is stored in one or more corresponding tenant data storage units, and wherein data associated with the tenant included in the transfer is stored and mixed together with data associated with one or more other tenants in the commingled storage unit;

filtering report data using the set of filters to obtain filtered report data, wherein filtering the report data does not pass data associated with an other tenant of the one or more other tenants; and providing the filtered report data to the tenant.

* * * * *